(12) United States Patent
Becker et al.

(10) Patent No.: US 7,401,740 B2
(45) Date of Patent: *Jul. 22, 2008

(54) RFID TAG AND COMMUNICATION PROTOCOL FOR LONG RANGE TAG COMMUNICATIONS AND POWER EFFICIENCY

(75) Inventors: Robert C. Becker, Eden Prairie, MN (US); David W. Meyers, Brooklyn Park, MN (US); Sabera Kazi, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 91 days.

This patent is subject to a terminal disclaimer.

(21) Appl. No.: 11/373,432

(22) Filed: Mar. 9, 2006

(65) Prior Publication Data

US 2006/0175408 A1   Aug. 10, 2006

Related U.S. Application Data

(62) Division of application No. 10/235,695, filed on Sep. 5, 2002, now Pat. No. 7,044,387.

(51) Int. Cl.
*G06K 19/00* (2006.01)
(52) U.S. Cl. .................. 235/487; 235/451
(58) Field of Classification Search .......... 235/385, 235/451, 492, 487; 340/10.1–10.4
See application file for complete search history.

(56) References Cited

U.S. PATENT DOCUMENTS

| | | | |
|---|---|---|---|
| 5,151,684 A | 9/1992 | Johnsen | |
| 5,305,199 A | 4/1994 | LoBiondo et al. | |
| 5,319,544 A | 6/1994 | Schmerer et al. | |
| 5,469,142 A | 11/1995 | Bergman et al. | |
| 5,533,079 A | 7/1996 | Colburn et al. | |
| 5,644,576 A | 7/1997 | Bauchot et al. | |
| 5,671,362 A | 9/1997 | Cowe et al. | |
| 5,741,984 A | 4/1998 | Gaete | |
| 5,777,884 A | 7/1998 | Belka et al. | |
| 5,781,004 A | 7/1998 | Gaete | |
| 5,841,770 A | 11/1998 | Snodgrass et al. | |
| 5,929,779 A * | 7/1999 | MacLellan et al. | 340/10.2 |
| 5,940,006 A * | 8/1999 | MacLellan et al. | 340/10.1 |
| 5,949,335 A | 9/1999 | Maynard | |
| 5,962,834 A | 10/1999 | Markman | |
| 6,034,603 A | 3/2000 | Steeves | |
| 6,050,490 A | 4/2000 | Leichner et al. | |
| 6,078,251 A | 6/2000 | Landt et al. | |
| 6,091,319 A | 7/2000 | Black et al. | |
| 6,107,910 A | 8/2000 | Nysen | |

(Continued)

FOREIGN PATENT DOCUMENTS

| | | |
|---|---|---|
| WO | WO 99/17230 | 4/1999 |
| WO | WO 99/45761 | 9/1999 |

*Primary Examiner*—Daniel St. Cyr
(74) *Attorney, Agent, or Firm*—Fogg & Powers LLC

(57) ABSTRACT

An RFID tag has a frequency agile RF transceiver that transmits data from the RFID tag to a reader and a direct sequence spread spectrum RF receiver that receives communications from the reader. Messages between the reader and the RFID tag are divided into frames, and each frame contains a frame header transmitted by the reader and at least one time slot containing data transmitted by the RFID tag. The frame header contains a hop sequence and a frequency in a hop sequence to be used by the RFID tag in transmitting data to the reader.

29 Claims, 3 Drawing Sheets

U.S. PATENT DOCUMENTS

| | | |
|---|---|---|
| 6,150,948 A | 11/2000 | Watkins |
| 6,211,781 B1 | 4/2001 | McDonald |
| 6,265,963 B1 | 7/2001 | Wood, Jr. |
| 6,297,734 B1 * | 10/2001 | Richardson et al. .... 340/539.26 |
| 6,317,028 B1 | 11/2001 | Valiulis |
| 6,330,971 B1 | 12/2001 | Mabry et al. |
| 6,337,634 B1 | 1/2002 | O'Toole et al. |
| 6,351,630 B2 | 2/2002 | Wood, Jr. |
| 6,353,406 B1 | 3/2002 | Lanzl et al. |
| 6,362,737 B1 | 3/2002 | Rodgers et al. |
| 6,375,780 B1 | 4/2002 | Tuttle et al. |
| 6,609,656 B1 | 8/2003 | Elledge |
| 6,615,175 B1 * | 9/2003 | Gazdzinski .................. 704/275 |
| 6,726,099 B2 | 4/2004 | Becker et al. |
| 7,044,387 B2 * | 5/2006 | Becker et al. ............... 235/492 |
| 2001/0048363 A1 | 12/2001 | Trosper |

* cited by examiner

RFID TAG AND COMMUNICATION PROTOCOL FOR LONG RANGE TAG COMMUNICATIONS AND POWER EFFICIENCY

CROSS REFERENECE TO RELATED APPLICATION

This is a Divisional Application of U.S. application Ser. No. 10/235,695, now U.S. Pat. No. 7,044,387, filed Sep. 5, 2002, the disclosure of which is incorporated herein by reference.

TECHNICAL FIELD OF THE INVENTION

The present invention relates to a tag that can be suitably attached to an article and that operates in accordance with a communication protocol promoting long range communications and power efficiency.

BACKGROUND OF THE INVENTION

Various labels have been attached to articles so that the articles can be distinguished one from the other. For example, bar code labels are attached to articles of grocery and are scanned at a check-out counter in order to automatically identify the articles and to register the price of the articles as they are purchased.

Bar code labels have also been used in inventory control and monitoring. Accordingly, these bar codes may be scanned in order to track articles as they move into, through, and out of a storage area. It is also known to read the bar codes attached to articles in order to access various computer records regarding the articles.

Bar code labels, however, have several drawbacks. For example, computer stored records that are accessed when a bar code is read do not move with the corresponding article. Therefore, if the article to which the bar code label is attached is remote from the computer, the records concerning that article cannot be immediately accessed if necessary.

Moreover, bar code labels cannot be read remotely. Thus, if it is desired to take an inventory of articles currently in the storage area, personnel must physically scan each label on each article one at a time in order to determine which articles are presently in the storage area. Such scanning requires the physical presence of the personnel at the location of the articles and is extremely time consuming. Additionally, because bar code labels cannot be read remotely, they cannot be used as security devices that can be detected if the articles to which they are attached are improperly removed from a secured area.

Instead of bar coded labels, it is known to attach radio frequency identification (RFID) tags to the articles to be monitored. The RFID tags can be read, as can bar code labels. However, unlike bar code labels, reading RFID tags does not require the physical presence of personnel because the RFID tags can instead be read remotely. Thus, inventory can be taken more quickly because personnel are not required to walk around a storage area or other area in order to read the RFID tags. Moreover, because RFID tags can be read remotely, they can be used as security devices. Thus, if someone attempts to surreptitiously remove an article to which an RFID tag is attached from a secured area, a remote reader can sense the tag and provide an appropriate alarm.

RFID tags can be read one at a time or in groups. When multiple RFID tags in a group are read at the same time, the information transmitted by the multiple tags frequently collide. Accordingly, spread spectrum techniques, such as either direct sequence spread spectrum (DSSS) or frequency hopping, in the communications between the reader and the tags have been suggested in order to reduce the impact of such collisions. It is also known to interrogate a tag using either a direct sequence spread spectrum (DSSS) signal or a frequency hopping signal.

In one embodiment, the present invention combines a direct sequence spread spectrum RF receiver and a frequency hopping transmitter in an RFID tag in order to overcome deficiencies of prior art tags. In another embodiment, the present invention relies on a communications protocol that supports the use of frequency hopping communications between the RFID tag and a reader.

The combination of direct sequence spread spectrum for signal reception and frequency hopping for signal transmission relative to a tag has not been previously suggested. Both of these modulation techniques circumvent jamming or interference by other signals. Also, the use of a direct sequence spread spectrum RF receiver in a tag permits the tag to properly synchronize to, and decode, the signal received from the reader in a shorter period of time than if the reader transmits the signal using frequency hopping. At the same time, this arrangement permits the tag to be interrogated by the reader over long distances while conserving power.

SUMMARY OF THE INVENTION

In accordance with one aspect of the present invention, an RFID tag comprises a frequency agile RF transmitter and a direct sequence spread spectrum RF receiver. The frequency agile RF transmitter transmits data to a reader, and the direct sequence spread spectrum RF receiver receives communications from the reader.

In accordance with another aspect of the present invention, an electrical signal transmitted between a reader and an RFID tag contains a message divided into frames. Each frame contains a frame header transmitted by the reader and at least one time slot containing data transmitted by the RFID tag, and the frame header contains a frequency in a hop sequence to be used by the RFID tag in transmitting the data.

In accordance with still another aspect of the present invention, a method of transmitting information contained in a plurality of frames between a reader and a tag comprises the following: transmitting a frame header in each of the frames from the reader to the tag, wherein the frame header contains a frequency in a hop sequence; and, transmitting data in a time slot of at least one of the frames from the tag to the reader, wherein the data is transmitted at the frequency.

In accordance with yet another aspect of the present invention, a method of transmitting information contained in a single frame between a plurality of tags and a reader comprises the following: receiving a frame header at each of the tags, wherein the frame header is contained in the frame, wherein the frame also contains a plurality of time slots, and wherein the frame header contains a frequency in a hop sequence and the number of time slots in the frame; receiving a time slot header in each of the time slots at each of the tags, wherein each time slot header contains a number of the corresponding time slot; each of the tags non-deterministically selecting a corresponding time slot; and, each of the tags transmitting data in the time slot that is selected by the corresponding tag.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
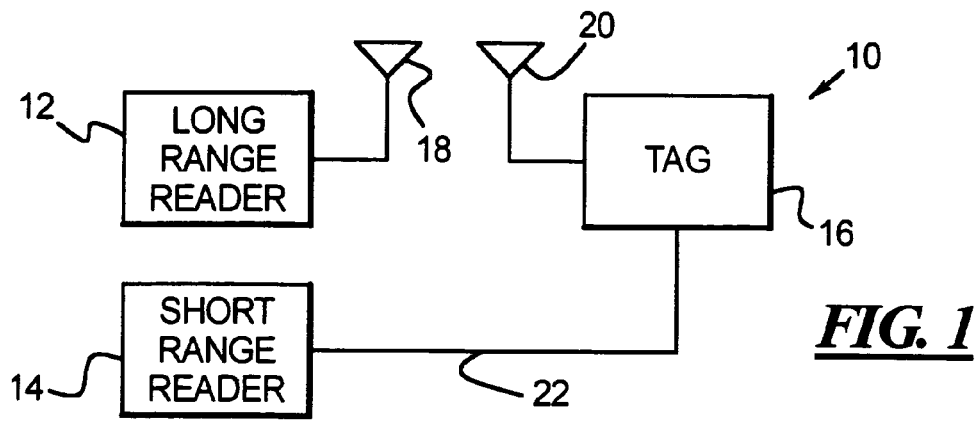
FIG. 1 illustrates a tagging system in accordance with one embodiment of the present invention.

As illustrated in FIG. 1, a tagging system 10 includes a long range reader 12, a short range reader 14, and an RFID tag 16. The long range reader 12 includes an antenna 18, and the RFID tag 16 similarly includes an antenna 20. The antennas 18 and 20 establish a long range RF link between the long range reader 12 and the RFID tag 16 so that the long range reader 12 can remotely read the identification stored in a memory of the RFID tag 16. The range of the long range reader 12 can be as high as several hundred feet. For example, the long range reader 12 can have an expected range of approximately 500 feet.

A secure link 22 between the short range reader 14 and the RFID tag 16 permits the short range reader 14 to read information from the RFID tag 16 in a more secure manner. That is, it may not be desirable for the long range reader 12 to read certain information stored in the RFID tag 16 because long range RF communications can be intercepted by a strategically placed surreptitious reader similar to the long range reader 12. Accordingly, the secure link 22 increases the difficulty in illicitly acquiring the more sensitive information that may be stored on the RFID tag 16.

The secure link 22 is shown in FIG. 1 as a hard wire link between the short range reader 14 and the RFID tag 16. Accordingly, the more sensitive information stored on the RFID tag 16 can be read by establishing a physical interconnection between the short range reader 14 and the RFID tag 16. Alternatively, the secure link 22 may be a limited range magnetic link such as those provided by contact-free smart cards. As a still further alternative, the secure link 22 may be a very limited range RF link. Other alternatives will occur to those skilled in the art. The expected maximum range of the short range reader 14 over the secure link 22, for example, may be less than two feet, and is expected, in typical usage, to be between six inches and eighteen inches.

Figure 2:
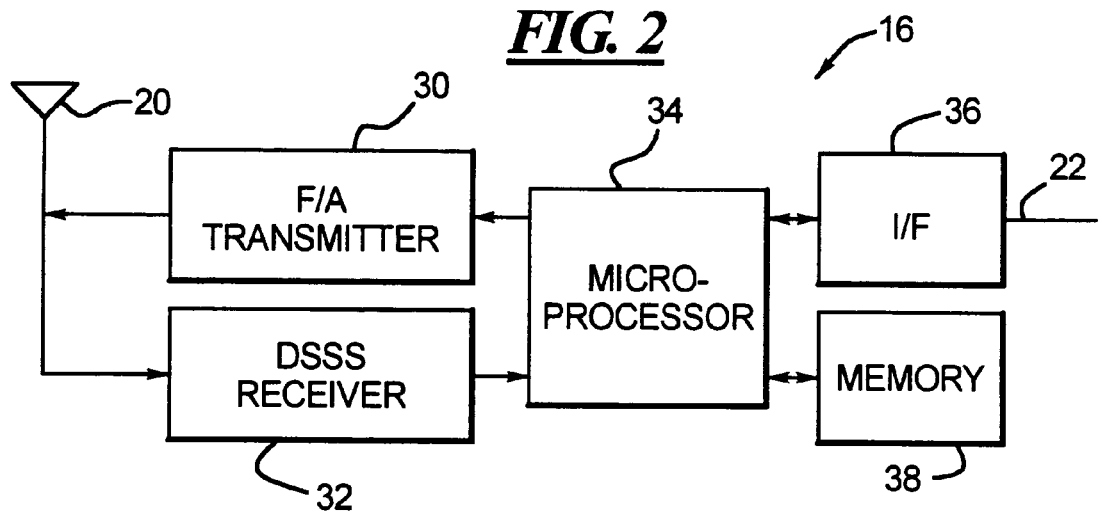
FIG. 2 illustrates additional detail of a tag that can be used with the tagging system of FIG. 1.

An embodiment of the RFID tag 16 is shown in additional detail in FIG. 2. The RFID tag 16 includes a frequency agile (frequency hopping) RF transmitter 30 and a direct sequence spread spectrum RF receiver 32. The frequency agile RF transmitter 30 and the direct sequence spread spectrum RF receiver 32 are coupled between the antenna 20 and a microprocessor 34. Accordingly, the frequency agile RF transmitter 30 of the RFID tag 16 implements frequency hopping in transmitting information to the long range reader 12, and the direct sequence spread spectrum RF receiver 32 of the RFID tag 16 implements direct sequence spread spectrum synchronization and decoding in receiving communications from the long range reader 12.

The RFID tag 16 also includes an interface 36 between the microprocessor 34 and the short range reader 14. Accordingly, the RFID tag 16 can transmit and receive communications to and from the short range reader 14. In the case where the secure link 22 is a hardwire link, the interface 36 may simply be a plug that is connectible to a corresponding plug of the short range reader 14. In the case where the secure link 22 is an RF link, the interface 36 may be an RF transceiver of any known type provided that this RF transmitter preferably has a much shorter range than the frequency agile RF transmitter 30 and the direct sequence spread spectrum RF receiver 32. In the case where the secure link 22 is a magnetic link, the interface 36 may simply be a magnetic emitter/sensor capable of magnetically interfacing with the short range reader 14.

The RFID tag 16 further comprises a memory 38 coupled to the microprocessor 34. The memory 38 stores the ID of the RFID tag 16 that can be read by the long range reader 12 through the antennas 18 and 20, the frequency agile RF transmitter 30, the direct sequence spread spectrum RF receiver 32, and the microprocessor 34. The memory 38 also stores information supplied to it by the short range reader 14 through the secure link 22, the interface 36, and the microprocessor 34. The memory 38 can additionally store information supplied by the long range reader 12.

This information can include, for example, the inventory history of the article to which the RFID tag 16 is attached. Accordingly, the date that the article entered inventory, the date that the article left inventory, the length of time that the article has been in inventory, any movement into and out of inventory, and similar information may be stored in the memory 38.

The information stored in the memory 38 may also include shipping manifests that indicate when and to whom the article is to be shipped. Moreover, in the case where individual articles with differing destinations are shipped in the same container, an RFID tag attached to the container, hereafter called a container tag, can be attached to the container. This container tag may be arranged to store the identity and destination of each article in the container. As articles are removed from the container, the information stored in the container tag can be updated to indicate which articles have been removed, the location at which the articles were removed, and the identity of the personnel who removed the articles.

The information stored in the memory 36 may further include maintenance, repair, and date of service records showing the maintenance and/or repair history of the corresponding article.

Other information related to the article may likewise be stored in the memory 38. For example, the integrity of the information stored in the memory 38 can be assured by keeping a record of the modifications to the stored information and of the identity of the personnel making the modifications. As another example, records related to the production of the article may be stored in the memory of the tag.

Accordingly, any information about the article may be stored with the article instead of in a remote computer system or on paper.

Because the records are carried by the RFID tag 16 attached to a corresponding article, the RFID tag 16 eliminates the need to maintain paper or computer records of the life history of an article, the RFID tag 16 eliminates the problem of lost or misplaced records, and the RFID tag 16 improves operational efficiency by eliminating the requirement to retrieve records prior to accessing and/or operating on the article.

The RFID tag 16 may include a battery (not shown) that is coupled so that it supplies power to the frequency agile RF transmitter 30, the direct sequence spread spectrum RF receiver 32, the microprocessor 34, the interface 36 (if necessary), and the memory 38. Moreover, a plurality of sensors (also not shown) may be coupled to the microprocessor 34. These sensors may include, for example, a temperature sensor, a humidity sensor, and other sensors such as a pressure sensor, a proximity sensor, an electromagnetic sensor, an optical sensor, a mechanical sensor, a chemical sensor, and/or the like. The microprocessor 34 stores the information from the sensors in the memory 38, and this information may be read from the memory 38 by the short range reader 14 or by the long range reader 12.

The microprocessor 34 may be arranged to further sense the voltage level of the battery. Accordingly, the microprocessor 34 stores this voltage level in the memory 38, and this stored voltage level may be read from the memory 38 by the short range reader 14 or by the long range reader 12. Thus, if the voltage level of the battery as read by either the short range reader 14 or the long range reader 12 indicates that the battery needs charging or replacement, suitable remedial action may be taken.

Because of the frequency agile RF transmitter 30 and the direct sequence spread spectrum RF receiver 32, the RFID tag 16 is capable of relatively long range activation while providing a low power method for command-response activation by the long range reader 12. This long range activation allows the RFID tag 16 to be placed at distances remote from the long range reader 12 for purposes of interrogating the RFID tag 16 for its unique tag number and possibly other information.

The frequency agile RF transmitter 30 and the direct sequence spread spectrum RF receiver 32 allow the tagging system 10 to operate in the FCC defined Industrial Scientific and Medical (ISM) bands at maximum legal power. Both frequency hopping as used by the frequency agile RF transmitter 30 and direct sequence spread spectrum communications as used by the direct sequence spread spectrum RF receiver 32 circumvent jamming by narrow-band signals using different methods of spreading the signal over a large bandwidth. The direct sequence spread spectrum RF receiver 32 can receive signals from the long range reader 12 within milliseconds of activation. By contrast, a frequency agile receiver must search a long frequency hopping sequence in order to receive signals from the long range reader 12. The time required to make this search is typically longer than the time required to detect a direct spread spectrum sequence because the direct spread spectrum signal is either on a fixed frequency or on one of only a few frequencies.

Figure 3:
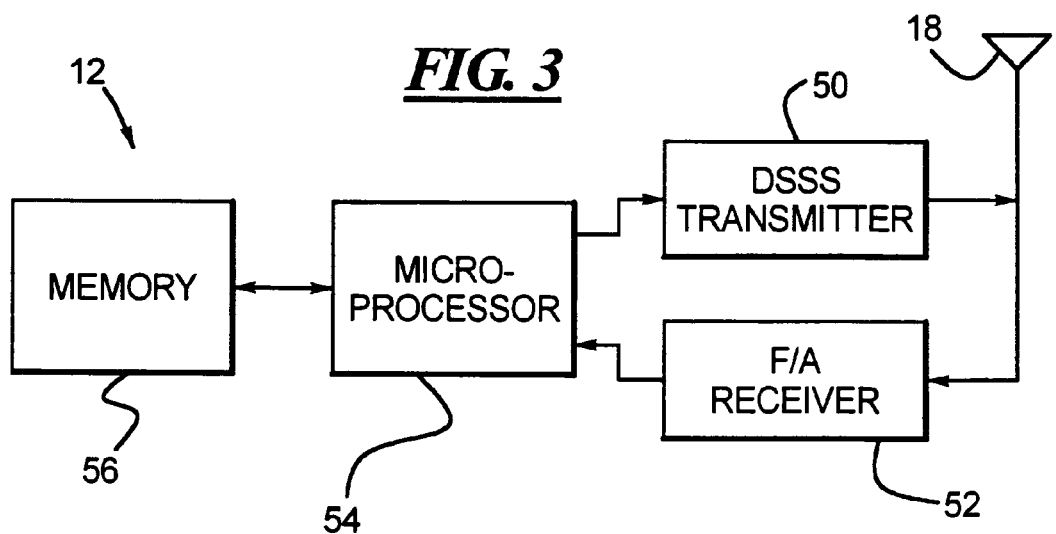
FIG. 3 illustrates additional detail of a reader that can be used with the tagging system of FIG. 1.

An embodiment of the long range reader 12 is shown in additional detail in FIG. 3. The long range reader 12 includes a direct sequence spread spectrum RF transmitter 50 and a frequency agile RF receiver 52 coupled between the antenna 18 and a microprocessor 54. The frequency agile RF receiver 52 of the long range reader 12 implements frequency hopping in receiving information from the frequency agile RF transmitter 30 of the RFID tag 16. Moreover, the direct sequence spread spectrum transmitter 52 of the long range reader 12 implements direct sequence spread spectrum transmission in transmitting communications to the direct sequence spread spectrum RF receiver 32 of the RFID tag 16.

The long range reader 12 further comprises a memory 56 coupled to the microprocessor 34. The memory 56 stores the information that the long range reader 12 receives from the RFID tag 16. The memory 56 also stores the software that supports the communication protocol as described herein.

Figure 4:
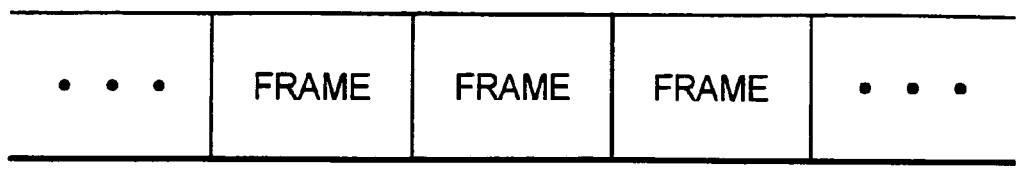
FIG. 4 illustrates a message format useful in supporting communications between the tag and the reader of FIG. 1.

This communication protocol governs the message format that is used between the long range reader 12 and the RFID tag 16. According to this protocol, a message is comprised of a plurality of frames as shown in FIG. 4. Each frame is preferably no longer than the length of time the frequency agile RF transmitter 30 is allowed to dwell at any given frequency.

Figure 5:
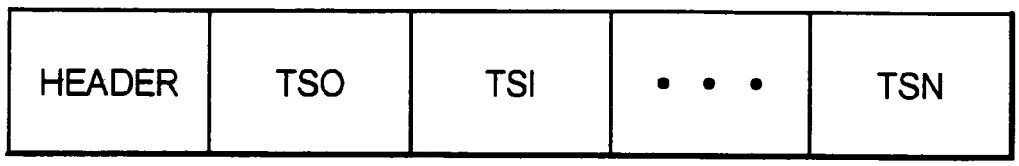
FIG. 5 illustrates an exemplary composition of a frame of the message format shown in FIG. 4.
Figure 6:
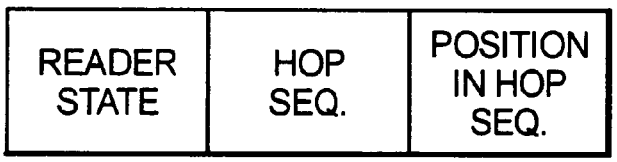
FIG. 6 illustrates an exemplary composition of the header of the frame shown in FIG. 5.

Each of the frames shown in FIG. 4 has the construction shown in FIG. 5. Accordingly, each frame has a frame header and a number of time slots TS0-TSN. The frame header contains information about the long range reader 12 that is reading the RFID tag 16. As shown in FIG. 6, the frame header contains (i) the state of the long range reader 12, (ii) the hop sequence currently being used by the long range reader 12 to receive messages from the RFID tag 16, (iii) and the current position (i.e., frequency) of the long range reader 12 in this hop sequence. The frame header can also contain such other information that is useful in the tagging system 10. For example, the frame header may also contain the number (N+1) of time slots in the corresponding frame.

The long range reader 12 may have several reader states including, for example, an active communication state and a beacon state. In the active communication state, the long range reader 12 commands responses from one or more selected tags such as the RFID tag 16. In the beacon state, the tags, such as the RFID tag 16, self-initiate the transmission of messages to the long range reader 12.

The hop sequence and/or the current position in the hop sequence as contained in the frame header are/is useful to tags that have limited signal processing capability. Such tags for example, may have no capability themselves to determine the frequency (i.e., the current position in the hop sequence) onto which they should transmit their responses.

Figure 7:
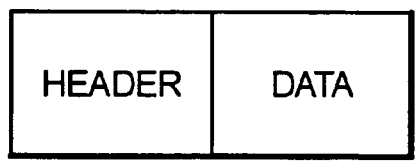
FIG. 7 illustrates an exemplary composition of a time slot of the frame shown in FIG. 5.
Figure 8:
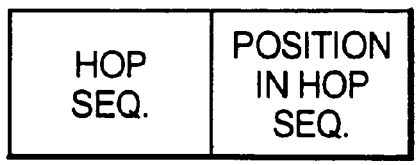
FIG. 8 illustrates an exemplary composition of the header of the time slot shown in FIG. 6; and, FIGS. 9 and 10 are flow charts showing an exemplary operation of the tag illustrated in FIGS. 1 and 2.

Moreover, each time slot may also include a time slot header and data as shown in FIG. 7, and each time slot header, as shown in FIG. 8, may contain the hop sequence and the current position in the hop sequence of the long range reader 12. The time slot header may also contain the relative position, such as a time slot number (0, 1, . . . , or N), of the corresponding time slot in the frame. This relative position information may be used by the RFID tag 16 to establish a relative timing interval into which the RFID tag 16 can transmit data. By transmitting the hop sequence and the current position in the hop sequence at the beginning of each time slot, the RFID tag 16 is aided in its rapid acquisition of the current hop sequence and frequency. Because the RFID tag 16 can acquire, from the time slot header in each time slot, sufficient information about the frequency and timing of the long range reader 16, the RFID tag 16 may power down until such time that it expects the complete header information to be transmitted by the long range reader 12. Therefore, the RFID tag 16 is able to substantially reduce the amount of power that it uses to determine the frequency and timing to be used by its frequency agile RF transmitter 30 in transmitting information in the data portion of the time slot.

As indicated above, the long range reader 12 transmits all headers, whether frame headers or time slot headers. The RFID tag 16 transits only in the data portion of the time slots. The RFID tag 16 may implement a non-deterministic method of selecting a time slot for the transmission of data. By using a non-deterministic method of selecting a time slot, the possibility of a plurality of tags transmitting data into the same time slot is minimized. For purposes of illustration, such a non-deterministic method of selecting a time slot could be embodied by a pseudo-random number generator that pseudo-randomly generates a number of a time slot into which its corresponding tag transmits its data. This implementation results in a communications protocol similar to, but not identical to, the Aloha protocol, a standard communications protocol.

The long range reader 12 can communicate directly with a specific tag or a group of specific tags. When the long range reader 12 is communicating directly with a specific tag or a group of specific tags, the long range reader 12 may suspend the transmission of time slot headers. This suspension indicates to all other tags that their communications are to be suspended. Also, all data may be transmitted between the long range reader 12 and the RFID tag 16 in packets having packet numbers so that both the long range reader 12 and the RFID tag 16 can detect missing or duplicate data. Moreover, acknowledgements can be used to signify a successful transmission between the long range reader 12 and the RFID tag 16. A failure to receive an acknowledgement can cause re-transmission of the information. Once a transaction between the long range reader 12 and a specific tag or group of tags is complete, the long range reader 12 resumes transmitting the headers.

Figure 9:
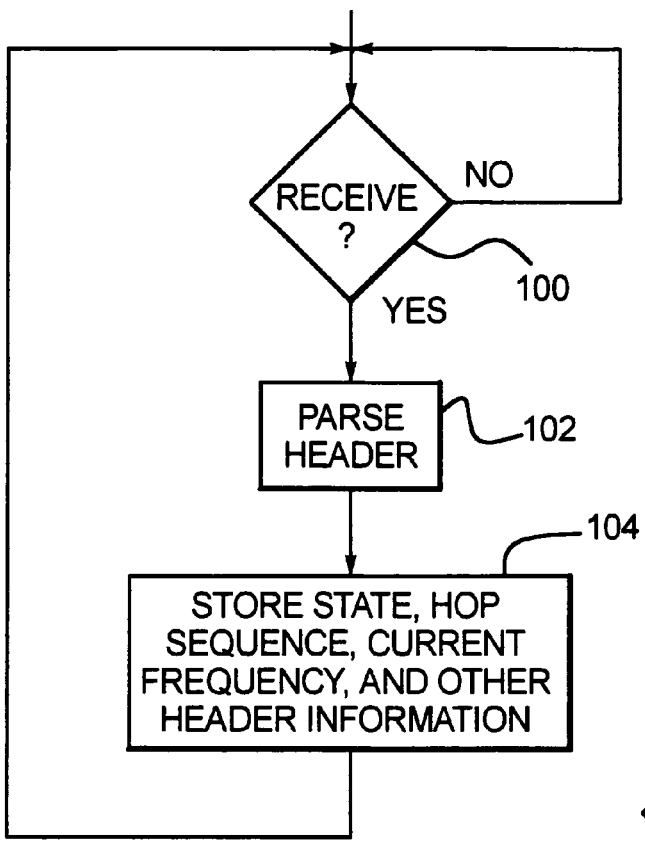

As shown in FIG. 9, when the RFID tag 16 detects a received message at the direct sequence spread spectrum RF receiver 32 as indicated by a block 100, the RFID tag 16 parses the header information as indicated by a block 102 and, as indicated by a block 104, stores the reader state, the hop sequence, the current position in the hop sequence, and any other information that is contained in the header.

Figure 10:
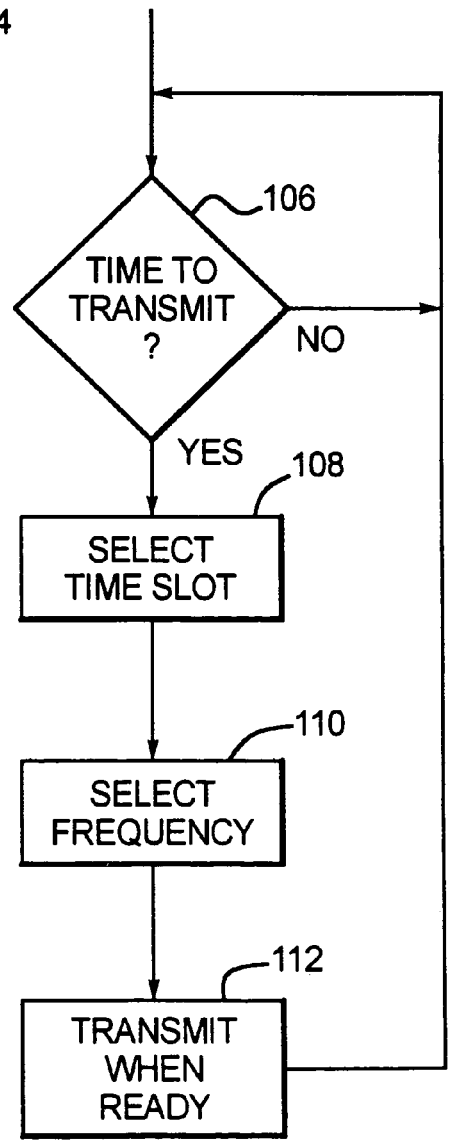

As shown in FIG. 10, when it is time for the RFID tag 16 to transmit data as indicated by a block 106, the RFID tag 16 selects the time slot in which it is to transmit the data as indicated by a block 108, the RFID tag 16 selects the frequency at in which it is to transmit the data as indicated by a block 110, and the RFID tag 16 causes the frequency agile RF transmitter 30 to transmit the data in the selected time slot using the selected frequency as indicated by a block 112.

The time at which the RFID tag 16 is to transmit data (the block 106) depends on the state of the long range reader 12. If the reader state as contained in the header and stored by the RFID tag 16 (block 104) indicates that the long range reader 12 is in the beacon mode, the RFID tag 16 self-originates the transmission of data. In this state, the RFID tag 16, for example, may be arranged to transmit data periodically based on a timer. When the timer indicates that it is time to transmit, the RFID tag 16 pseudo-randomly selects a time slot as indicated by the block 108, selects a transmission frequency as indicated by the block 110, and transmits as indicated by the block 112.

If the long range reader 12 is in an active communication state, the RFID tag 16 determines that it is time to transmit when it receives an interrogation message from the long range reader 12. When the RFID tag 16 receives an interrogation message, the RFID tag 16 pseudo-randomly selects a time slot as indicated by the block 108, selects a transmission frequency as indicated by the block 110, and transmits as indicated by the block 112.

Other reader states for the long range reader 12 are also possible.

As indicated above, the time slot in which the RFID tag 16 transmits data may be selected based on the pseudo-randomly generated number. The frequency at which the RFID tag 16 transmits data is selected based on the current position in the hop sequence as received (block 100) and stored (block 104) by the RFID tag 16 (block 100).

Certain modifications of the present invention have been disclosed above. Other modifications will occur to those practicing in the art of the present invention. For example, the functions of the long range reader 12 as described above have been confined to reading information from the RFID tag 16. However, the long range reader 12 can also be arranged to write information to the RFID tag 16.

Also, as described above, the long range reader 12 is arranged to read the tag ID of the RFID tag 16, and the short range reader 14 is arranged to read other information from the RFID tag 16. However, the long range reader 12 may be arranged instead to read any combination of tag ID and other information from the RFID tag 16, and the short range reader 14 may be similarly arranged to read any combination of the tag ID and other information from the RFID tag 16.

Moreover, although the RFID tag 16 is shown as a microprocessor based tag in FIG. 2, the RFID tag 16 may instead comprise one or more digital circuit elements, and/or a programmable logic array, and/or a dedicated integrated circuit, etc.

Furthermore, the long range reader 12 as described above has a range of several hundred feet and could have an expected range of approximately 500 feet. However, this range could be longer or shorter depending on the application and/or other factors. Similarly, the range given above for the short range reader 14 could be other than as described above.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. An electrical signal transmitted between a reader and RFID tags, wherein the electrical signal contains a message divided into frames, wherein each frame contains a frame header transmitted by the reader and a plurality of time slots, wherein at least one of the time slots contains data transmitted by a corresponding RFID tag, wherein each of the time slots in a frame comprises a slot header, wherein each of the slot headers contains a frequency in a hop sequence to be used by at least one of the RFID tags in transmitting data, and wherein the frame header contains a frequency in a hop sequence to be used by at least one of the RFID tags in transmitting data.

2. The electrical signal of claim 1 wherein the frame header also contains the hop sequence.

3. The electrical signal of claim 1 wherein the frame header also contains a reader state.

4. The electrical signal of claim 3 wherein the reader state indicates that the RFID tag is to operate in a beacon mode.

5. The electrical signal of claim 3 wherein the reader state indicates that the RFID tag is to operate in an active communication mode.

6. The electrical signal of claim 5 wherein the reader state indicates that the RFID tag is to operate in a beacon mode.

7. The electrical signal of claim 3 wherein the frame header further contains the hop sequence.

8. The electrical signal of claim 7 wherein the reader state indicates that the RFID tag is to operate in a beacon mode.

9. The electrical signal of claim 7 wherein the reader state indicates that the RFID tag is to operate in an active communication mode.

10. The electrical signal of claim 9 wherein the reader state indicates that the RFID tag is to operate in a beacon mode.

11. The electrical signal of claim 1 wherein each of the time slots contains a data portion for the transmission of data by a corresponding RFID tag, and wherein the data portion of at least one of the time slots contains the data transmitted by a corresponding RFID tag at the frequency contained in the slot header.

12. The electrical signal of claim 11 wherein the frame header and the time slot headers also contain the hop sequence.

13. The electrical signal of claim 11 wherein the frame header also contains a reader state.

14. The electrical signal of claim 13 wherein the reader state indicates that the RFID tag is to operate in a beacon mode.

15. The electrical signal of claim 13 wherein the reader state indicates that the RFID tag is to operate in an active communication mode.

16. The electrical signal of claim 15 wherein the reader state indicates that the RFID tag is to operate in a beacon mode.

17. The electrical signal of claim 13 wherein the frame header and the time slot headers further contain the hop sequence.

18. The electrical signal of claim 17 wherein the reader state indicates that the RFID tag is to operate in a beacon mode.

19. The electrical signal of claim 17 wherein the reader state indicates that the RFID tag is to operate in an active communication mode.

20. The electrical signal of claim 19 wherein the reader state indicates that the RFID tag is to operate in a beacon mode.

21. The electrical signal of claim 1 wherein at least one of the time slots contains data transmitted by the reader.

22. A method of transmitting information contained in a plurality of frames between a reader and a plurality of tags comprising:

transmitting a frame header in each of the frames from the reader to the tags; and transmitting a slot header in each of the time slots from the reader to the tags, wherein each of the slot headers contains a frequency in a hop sequence to be used in transmitting data from the tags to the reader.

23. The method of claim 22 wherein the frame header also contains the hop sequence.

24. The method of claim 22 wherein the frame header also contains a reader state.

25. The method of claim 24 wherein the reader state indicates that the RFID tag is to operate in a beacon mode.

26. The method of claim 24 wherein the reader state indicates that the RFID tag is to operate in an active communication mode.

27. The method of claim 26 wherein the reader state indicates that the RFID tag is to operate in a beacon mode.

28. The method of claim 24 wherein the frame header further contains the hop sequence.

29. The method of claim 22 wherein each of the time slots contains a data portion transmitted by a corresponding RFID tag, and wherein the data portion of at least one of the time slots contains the data transmitted by a corresponding RFID tag at the frequency contained in the slot header.

* * * * *